US008753201B2

(12) United States Patent
Denlay et al.

(10) Patent No.: US 8,753,201 B2
(45) Date of Patent: Jun. 17, 2014

(54) SYSTEM, METHOD AND DISPLAY FOR A TABLE GAME

(75) Inventors: Christine Denlay, Las Vegas, NV (US); Philip Jeffrey Anderson, Las Vegas, NV (US)

(73) Assignee: Aristocrat Technologies Australia Pty, Ltd. (AU)

( * ) Notice: Subject to any disclaimer, the term of this patent is extended or adjusted under 35 U.S.C. 154(b) by 0 days.

(21) Appl. No.: 11/937,265

(22) Filed: Nov. 8, 2007

(65) Prior Publication Data

US 2008/0261690 A1 Oct. 23, 2008

Related U.S. Application Data

(60) Provisional application No. 60/858,042, filed on Nov. 9, 2006.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .................. 463/30; 463/11; 463/16; 463/20; 273/149 R; 273/292; 273/309

(58) Field of Classification Search
USPC ....................... 463/11–13, 17, 19, 25, 30, 37; 273/149 R, 292, 309
See application file for complete search history.

(56) References Cited

U.S. PATENT DOCUMENTS

| | | | | |
|---|---|---|---|---|
| 5,770,533 | A * | 6/1998 | Franchi | 463/42 |
| 6,800,029 | B2 * | 10/2004 | Rowe et al. | 463/25 |
| 6,873,257 | B2 * | 3/2005 | Maloney et al. | 340/539.21 |
| 7,018,291 | B1 * | 3/2006 | Lemke et al. | 463/12 |
| 2002/0158916 | A1 * | 10/2002 | Gusler et al. | 345/850 |
| 2006/0066052 | A1 * | 3/2006 | White et al. | 273/309 |
| 2006/0161871 | A1 * | 7/2006 | Hotelling et al. | 715/863 |

OTHER PUBLICATIONS

International Search Report corresponding to International Application Serial No. PCT/US2007/084134, mailed May 5, 2008, 3 pages.

Written Opinion of the International Searching Authority corresponding to International Application Serial No. PCT/US2007/084134, mailed May 5, 2008, 7 pages.

International Preliminary Report on Patentability for International Patent Application Serial No. PCT/US2007/084134, mailed May 22, 2009.

* cited by examiner

*Primary Examiner* — Milap Shah
*Assistant Examiner* — Jason Pinheiro
(74) *Attorney, Agent, or Firm* — McAndrews, Held & Malloy, Ltd.

(57) ABSTRACT

Systems, methods, and displays are disclosed for logging a player at a gaming table having a plurality of player positions for the purpose of tracking the play of the player. System can include a processor; a data structure storing account data for each player, the data including at least player identification data; a display configured to display a depiction of the gaming table, a plurality of player positions and a position locator, the locator positioned apart from the depicted player positions; a data input device to input data to position the locator to identify a player position; and a device to access the player account data, the processor associating player identification data with the identified player position. The locator can be configured as a pointer, e.g., a pointer and slide. The processor can be configured to highlight the position identified by the locator. Related methods and apparatus are also disclosed.

9 Claims, 5 Drawing Sheets

SYSTEM, METHOD AND DISPLAY FOR A TABLE GAME

RELATED APPLICATIONS

The present application claims priority to U.S. Provisional Patent Application No. 60/858,042 filed on Nov. 9, 2006, entitled "SYSTEM, METHOD AND DISPLAY FOR A TABLE GAME," which is herein incorporated by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present disclosure relates to systems, methods, and displays useful for monitoring players at a gaming table. Embodiments of the disclosure are directed to player monitoring systems, methods, and displays that provide a gaming table dealer with player information related to players located at different positions at the particular gaming table.

Due to competition among casinos and the desire to attract and retain gamblers, casinos generally award gamblers with complimentary services and merchandise, which are generally referred to as "comps." Comps are typically earned on the basis of the amount of money wagered by a particular gambler/player. Generally, comps are calculated on the basis of the theoretical win for the casino (or loss for the player), which in turn depends on the odds of the game and how much was wagered by the player. A theoretical win (percentage) is generally fairly easy to calculate for gaming machines, such as slot machines, due to the automated nature of the machines and also the ability of such machines to count value wagered and awards dispensed. Comps are often provided to players who wager large amounts of money in order to entice them to remain at, or return to the casino.

For table games, as opposed to slot machines, it is more difficult to calculate the theoretical win because bets change hands instead of being accounted for by an electronic gaming machine. In order to keep exact track, or provide an accurate estimate, of a player's gambling at table games, it is desirable to capture the size of each bet and the frequency of the bets, or the number of bets per unit of time. Keeping track of a player's betting activities in such ways is typically too cumbersome for casinos to do and therefore, casinos generally estimate a player's bets on the basis of the average bets at a particular gaming table in the casino. The casino can adjust the estimate of the player's average bet if it is observed (e.g., by the dealer or pit boss) that the player regularly bets more per bet and/or bets more in a given amount of time (number of games per hour, for example). Based upon the average bet and the known performance of the table game, e.g. win percentage, the theoretical win for the casino can then be calculated.

Comps have become a big point of attraction for casinos and, among other things, generally include free luxury suites and similar perks casinos generally offer their "high roller" customers, to less-expensive rewards such as free meals, merchandise, etc., offered to others. For example, a player who walks away with a large win (which itself usually results in a corresponding high player-loss to the casino based on the table odds) will receive the same comps as another player who incurs a loss (which itself is a direct win for the casino) where the two players play the same game and wager the same amount of money.

In attempt to more closely monitor gamblers and discern their respective betting patterns and overall worth to the casino, major casinos including those with multiple properties, have developed a practice of issuing a type of identification card to facilitate monitoring (typically with electronically identifiable information) of the betting activities of players. Such cards typically have a magnetic strip that carries player name, identification (ID) or account number for the player as well as other relevant information. On slot machines, a player typically inserts his card into a reader attached to or incorporated in the machine and thus, all coins dropped by the player are credited to his account from which the theoretical win of the casino is calculated and then credited to the player's account at a central computer. Some casinos have further attempted to better track player betting activity at gaming tables by implementing card-reading systems at individual gaming tables.

FIG. 1 depicts a prior art player monitoring system 1 implemented on a blackjack table 10 as described in U.S. Pat. No. 6,672,589. Prior art system 1 is described as being configured for tracking play of players at the blackjack table 10, as well as providing information pertaining to the players, and includes a card reader 12 located adjacent a dealer position 13. The card reader 12 is coupled to a central computer 14 via a communication channel 15. The central computer 14 keeps track of the various players' accounts. Each player's account may include player information, such as, for example, the player's account number. System 1 includes a display monitor 20 that displays a representation of the blackjack table 10, including all player positions 11 (11*a*-11*g*) while a game is being played. In operation, when a player sits down at the table, the player presents his or her player card to the dealer, who then enters or "swipes" the card into the card reader 12. After a card is read by the card reader 12, the dealer touches the respective player position on the display monitor 20 where the player whose card has just been read is seated, thus associating the table position of the new player with the new player.

While player monitoring systems and methods in accordance with the prior art, such as described above, may prove useful for some applications, problems and difficulties may arise, particularly in relation to dealer input of player position at a table, e.g., with regard to complexity of data input operations and requisite time for performing the same.

BRIEF SUMMARY OF THE INVENTION

One or more of the embodiments of the present invention provide improved systems and methods for storing, displaying, and altering player data at a gaming table.

Certain embodiments of the invention provide for a system utilizing an input device to indicate or alter a player's position indicated on a display and an identification device to authenticate a player's identity and display a player's information on the display.

Other embodiments provide for a method of monitoring a player's activity at a gaming table by storing player information, designating a player's position at a gaming table, tracking a player's betting history, and displaying a player's information.

These and other features of the present invention are discussed or apparent in the following detailed description.

BRIEF DESCRIPTION OF SEVERAL VIEWS OF THE DRAWINGS

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings. The drawings are not necessarily to scale, emphasis instead being placed on the principles of the disclosure.

Figure 1:
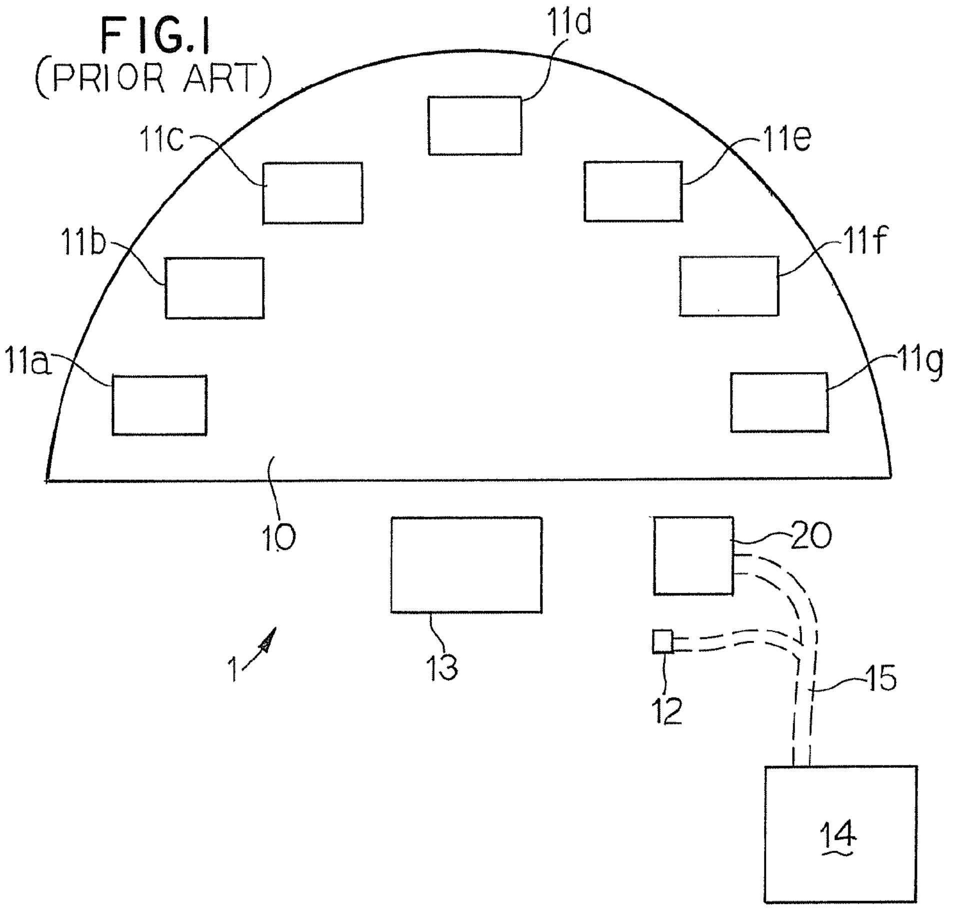
FIG. 1 (PRIOR ART)
FIG. 1 is a perspective view representing a prior art system for tracking players at a gaming table.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain embodiments of the present disclosure present systems, methods, and/or displays useful for monitoring player activity at a gaming table. For example, the seating position, betting history, win history, and other attributes of a player may be tracked at a gaming table such as those for blackjack, poker, baccarat, roulette, craps, Pai Gow, etc.

Figure 2:
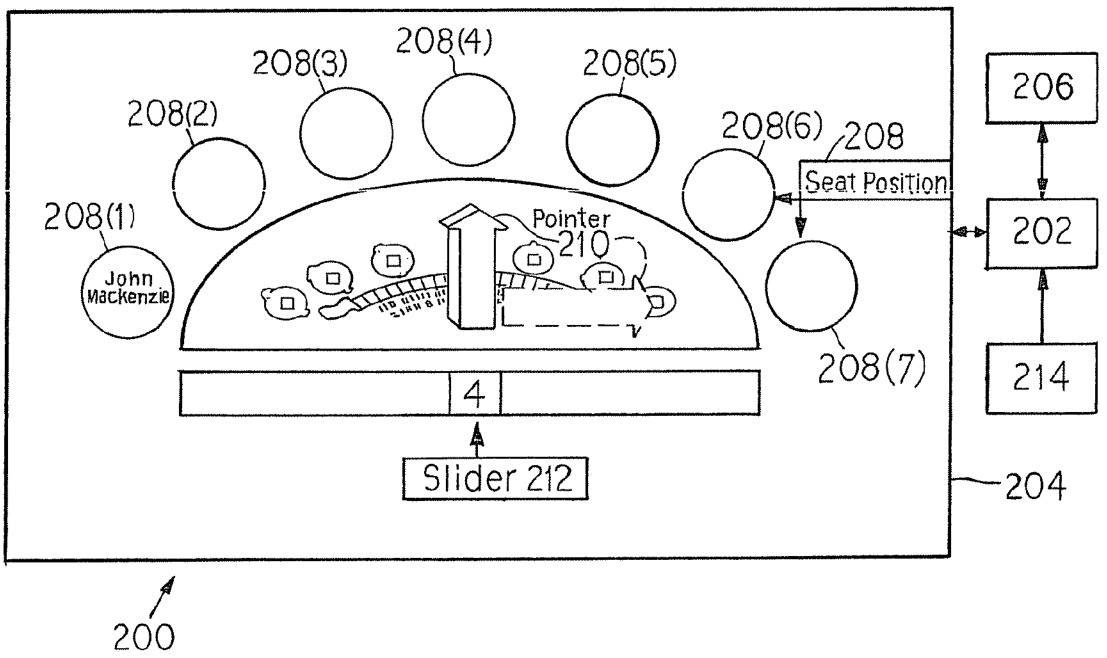
FIG. 2 is a schematic diagram depicting a layout view of a table game system according to an embodiment of the present disclosure.

FIG. 2 is a schematic diagram depicting a top view of a gaming table system 200 according to an embodiment of the present disclosure. As illustrated in FIG. 2, the gaming table system 200 may be used for any card game, including blackjack. The table as shown includes seven positions represented by circles 208(1)-208(7). A rectangular area 208 labeled "seat position" serves to indicate to the viewer of display 204 that the circles represent seat positions. Alternative embodiments may provide for tables with any number of seating positions, or systems capable of tracking player activity at multiple tables.

System 200 can include or be linked to a processor 202 that is linked by appropriate communication link to a display 204. System 200 can also be operatively linked to a data structure 206, database, or other suitable computing or storage functionality (e.g., a slot accounting system, or "SAS" computer). The data structure 206 may be used to store player account information. System 200 may include an account access device 214.

Account access device 214 may be used to access information related to a player's account. For example, the account access device 214 may be a card reader, wherein a player's identification card is inserted into the card reader. The card reader and/or a processor may determine a player's account number and provide it to the system 200. The account access device 214 may also be used to authenticate a player's identity. Other embodiments may include an account access device 214 that utilizes a keypad, or a biometric identification device such as a fingerprint scanner. The player's identification information may be provided to the processor 202. Access device 214 may be configured to accept an ID card input, e.g., as a card reader configured to read stored information on an ID card when a dealer "swipes" a player's ID card. A suitable card reader may be any type that is capable of reading or obtaining information from cards issued by the casino, such as, for example, a magnetic reader for reading magnetic stripes on cards, an electronic card reader for reading electronic cards, an RFID card reader, "smart card" reader and a data input device such as a keypad, touch screen or the like. While system 200 is described in relation to a typical blackjack table, one of skill in the art will appreciate that system 200 may be used in other gaming table applications, e.g., for poker, baccarat, roulette, etc.

Display 204 can any device enabled to display graphics supplied by a processor. For example, a computer monitor such as a CRT, plasma, LCD or other electronic display device. Display 204 can include a pointer 210 indicating a player location, e.g., 208(4) and a portion configured as data input device 212. The data input device 212 portion of display 204 may be enabled to accept input from a user and provide the input to other components of the system 200. The data input device 212 may be operative in tandem with pointer 210 to input a location on the display 204 that corresponds to a physical player position at the table. In an example embodiment, the data input device 212 may be a touch-screen based icon or display figure that is movable as shown in FIG. 2. More specifically, a user may touch the portion of display 204 identified as data input device 212 to provide input. A user may drag or slide their fingers along the data input device in order to move the pointer 210. Alternatively, the data input device 212 may take the form of touch sensitive keys or icons.

Figure 4A:
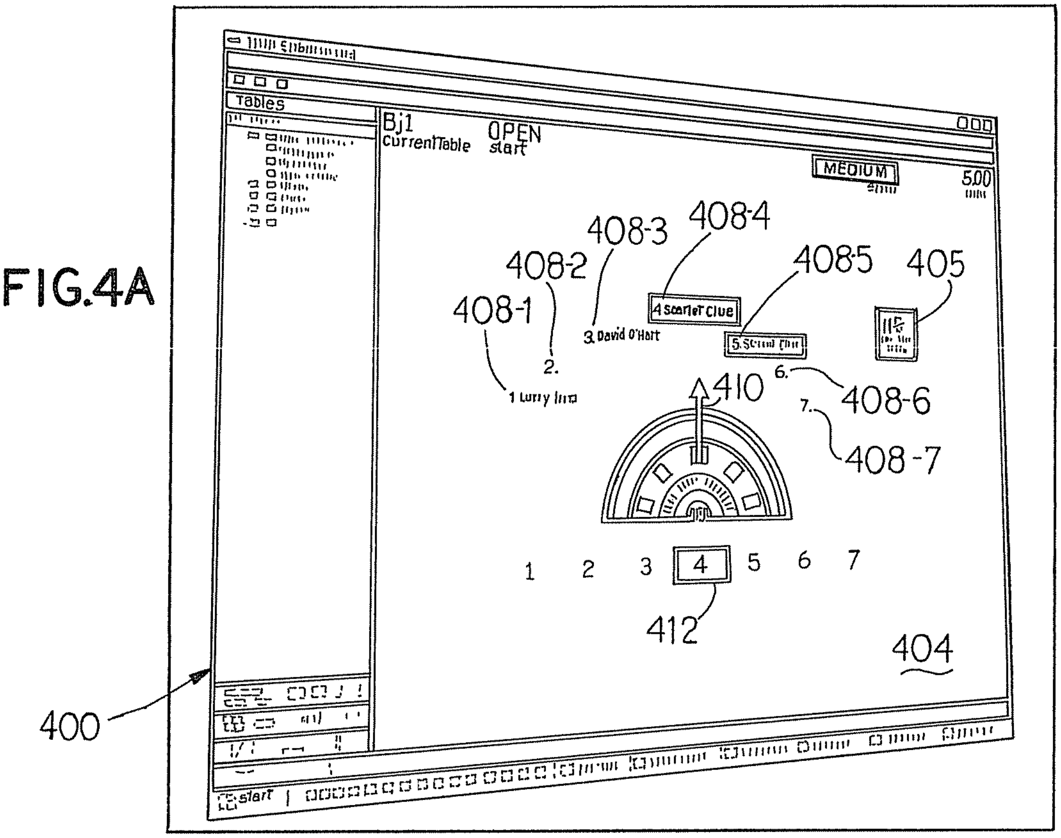
FIGS. 4A-4B depict front views of a display screen of an embodiment of the present disclosure.

In operation of system 200, when a player having an identification/information (ID) card sits down or gains access to a particular gaming table, the table dealer can log the player into system 200. Using the slider 212 the dealer locates the seat position of the player by touching the slider 212 in a corresponding position. For this purpose the slider 212 may include along its length number icons corresponding to player positions, e.g. numbers 1-7 spaced along the length of the slider 212 as shown in FIG. 4A. When a position is touched on the slider 212 the pointer 210 pivots to point toward the corresponding player position 208(1)-(7) which may also be highlighted, change color or brightness to indicate the correspondence. After position the player, the player's ID card data can be entered (e.g., read into, or swiped) at access device 214, which can include a suitable card reader. Alternative embodiments may provide for other identification techniques, such as the use of biometric scanners or keypads.

In an additional embodiment, the pointer 210 may be dispensed with and the slider 212 may be directly used to highlight and designate player positions 208(1)-208(7). Further, other embodiments of the system 200 may provide for multiple betting positions corresponding to a single seating position. For example, a single player at a blackjack table may play 2 or more hands simultaneously. The system 200 provides for tracking information of multiple hands related to a single player.

The player's account information can be accessed by processor 202, which can control the display of an indication of desired player account information, e.g., a particular color indicating one of inactive status, status or player credit history, elite player status, on the display 204. The player's account information and/or the player's identification may also be tied to a player's bank accounts. An icon may be presented on the display 204 which, when touched, calls up the player information on the display 204 or in a window in the display 204. If the player position is mistakenly entered, suitable correction can be taken, e.g., the process can be repeated or the dealer can "drag and drop" the player's indicated information to the correct seat on the display 204. Slider 212 can thus allow a dealer to quickly locate a player to a seat position without needing to touch various seat positions on a seat layout, simplifying and speeding up play at the table.

Figure 3:
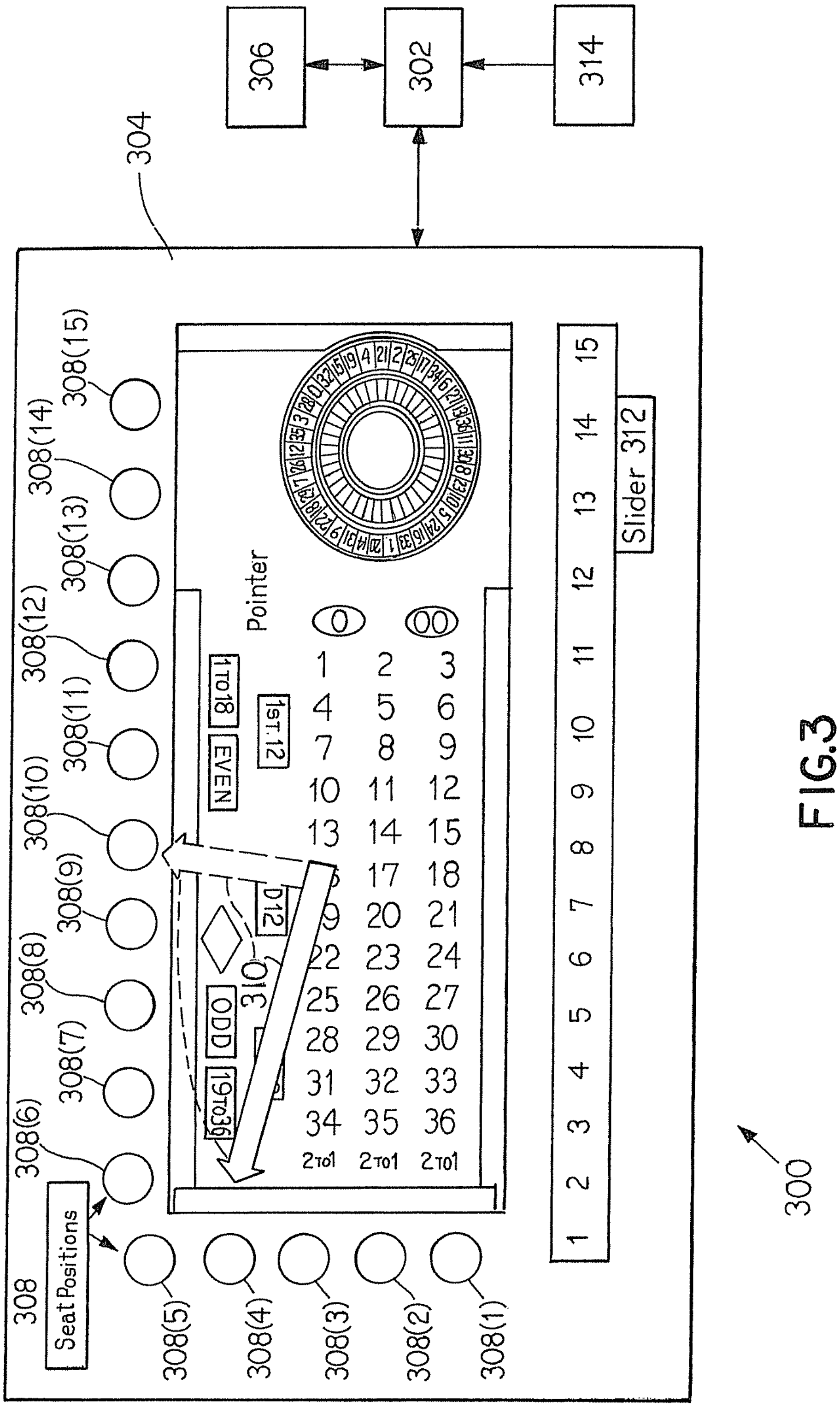
FIG. 3 is a schematic diagram of depicting a layout view of an embodiment according to the present disclosure in application with a roulette gaming table.

FIG. 3 is a schematic diagram depicting a top view of a table game system 300 according to an embodiment of the present disclosure, similar to system 200 and configured for application with a Roulette table. Roulette presents an issue inasmuch as players may crowd around the table presenting multiple and ill-defined player positions. Similar to system 200 of FIG. 2, system 300 can include processor 302 linked to display 304 and data structure 306, e.g., a database, and an account access device 314. Display 304 can include multiple player positions represented by circles 308(1)-308(15), a position pointer 310, and a data input device such as a slider 312. A rectangular area 308 labeled "seat positions" serves to indicate to the viewer of display 304 that the circles represent seat positions. Of course, it will be appreciated that while fifteen (15) positions 308(1)-308(15) are depicted for display 304 in FIG. 3, more or less positions may be displayed as desired.

Embodiments of the present disclosure, e.g., systems 200 or 300 and/or related method(s), may operate to visually display the pointer 210 and/or seat position such that status or information associated with an individual player's account is/are indicated. For example, at player log in, the pointer and/or when a particular player position is indicated may change color/pattern to convey player information or simply to confirm a correct log-in. Such a visual change can indicate, e.g., that the player is excluded from play, the player is in a certain player club level, the player is new to the card club, it is the player's birthday, etc. This visual display feature can provide a quick view of various features/attributes of the player's information without having to display or convey all of ("drill into") the information associated with the player's account. Player information may be called up using the touch screen pointer 212 to point to the correct player position.

Figure 4B:
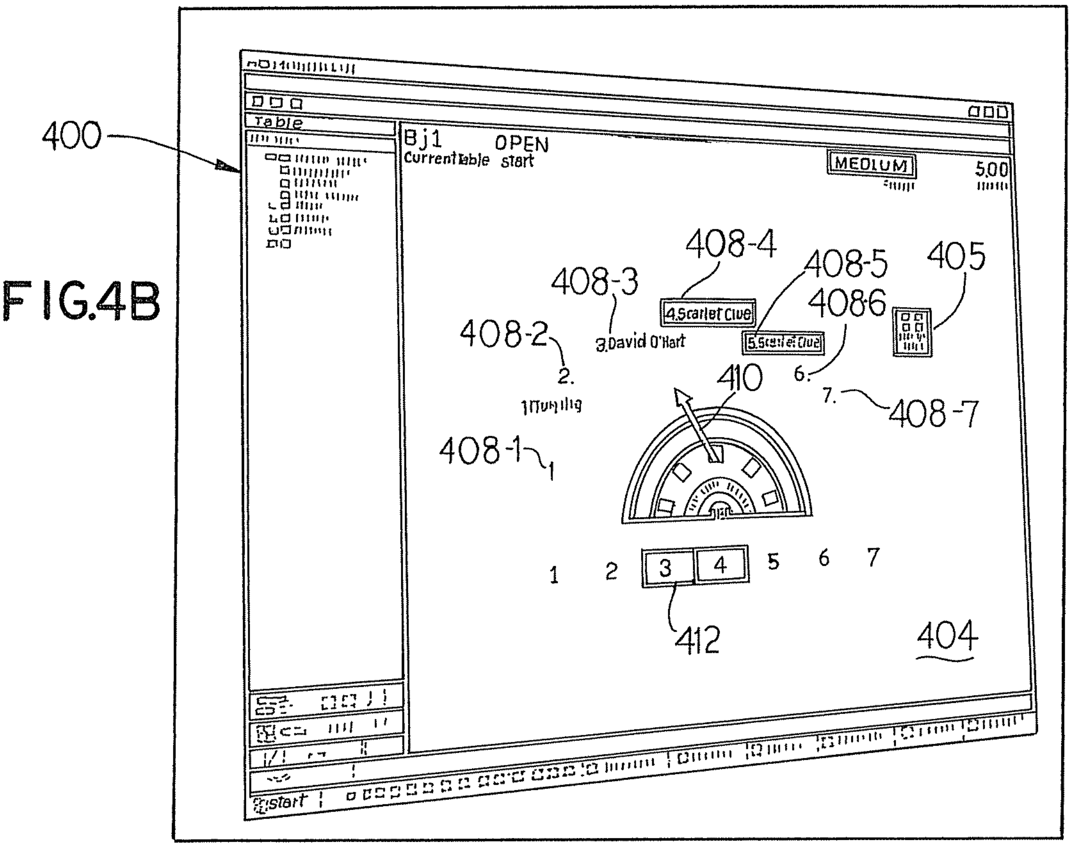

Details of operation in accordance with the present disclosure are shown in FIGS. 4A and 4B, which depict front views of an embodiment 400 of a display 404. Seven player positions 408(1)-408(7), such as seats at a blackjack table, are indicated, with pointer 410 and slider 412 configured to receive positioning input, e.g., from a dealer, and indicate a position of a player at the table, which is designated as blackjack table 1 "Bj1 Current Table."

In FIG. 4A, a screen shot of display 404, illustrating a graphical user interface (GUI), depicts selection of location "4" on slider 412 with corresponding orientation of pointer 410 to indicate table seat position 408(4). As shown, seat position 408(4) designates fictitious player "Scarlet Clue" as well as outlining and highlighting the name, so as to further visually attract attention to the selection of that seat position for the indicated player. Other embodiments may flash, pulse, or beep when a new player and/or position is selected or changes.

FIG. 4B depicts a screen shot of display 404 with user selection of location "3" on slider 412 with corresponding orientation of pointer 410 to indicate table seat position 408 (3). As shown, seat position 408(3) designates fictitious player "David O'Hart," with player position for player "Scarlet Clue" indicated. Slider 412 position "3" is indicated as being highlighted, so as to further visually highlight the selection of that slider position. A box outline and highlighted box are shown for previously selected slider position "4" and player position 408(4), respectively, as shown in FIG. 4.

Also shown in the display 404 is a data call-up icon 405 which, if touched by the dealer or floor personnel, would cause the display 404 or a portion of the display 404 to show player account data.

Figure 5:
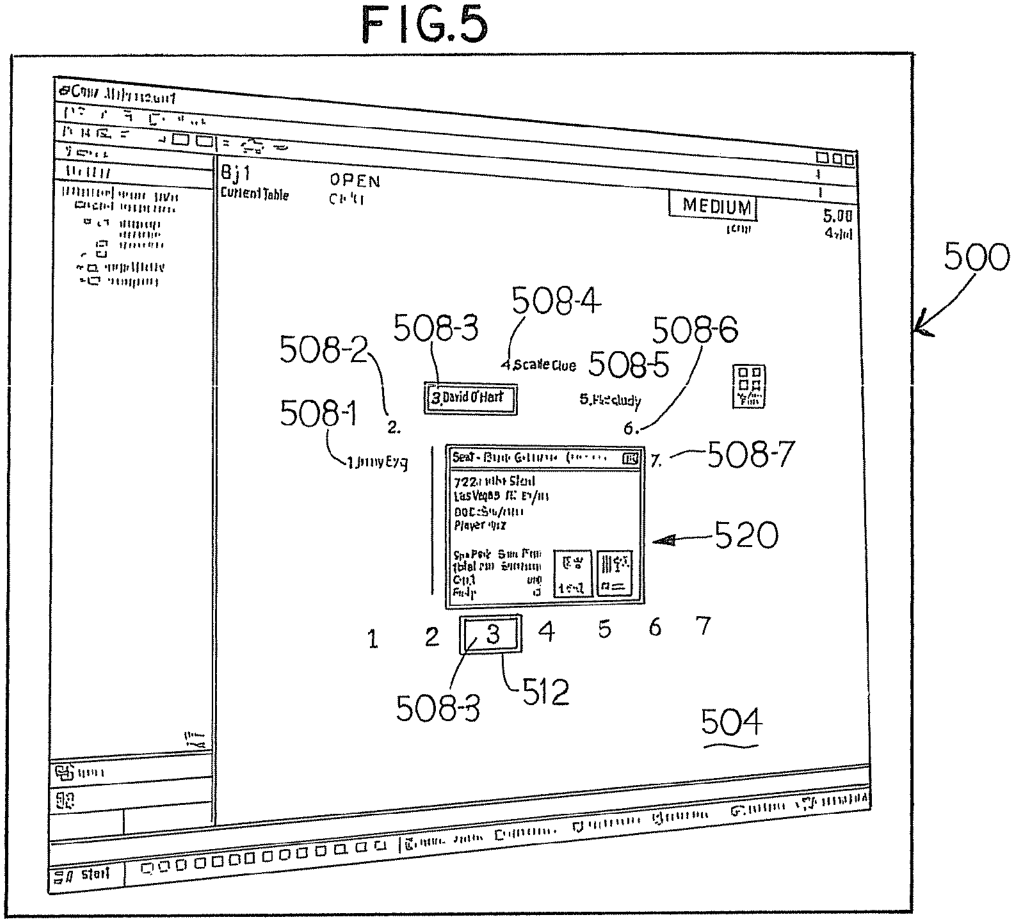
FIG. 5 is a front view of an embodiment, similar to that of FIGS. 4A-4B, in which player information is shown.

FIG. 5 is a front view of an embodiment 500, similar to that of FIGS. 4A-4B, including a display 504 indicating seven player locations 508(1)-508(7). Slider 512 is shown corresponding to player position 508(3), with display 504 indicating detailed player information 520 for the particular player seated at position 508(3), e.g., fictitious player "David O'Hart," which has been called-up from the database. In addition to being able to present detailed player information on a display, embodiments of the present disclosure may also allow for the display of information for a particular gaming table, e.g., with regard to combined or cumulative player betting actions as shown in FIG. 6

Figure 6:
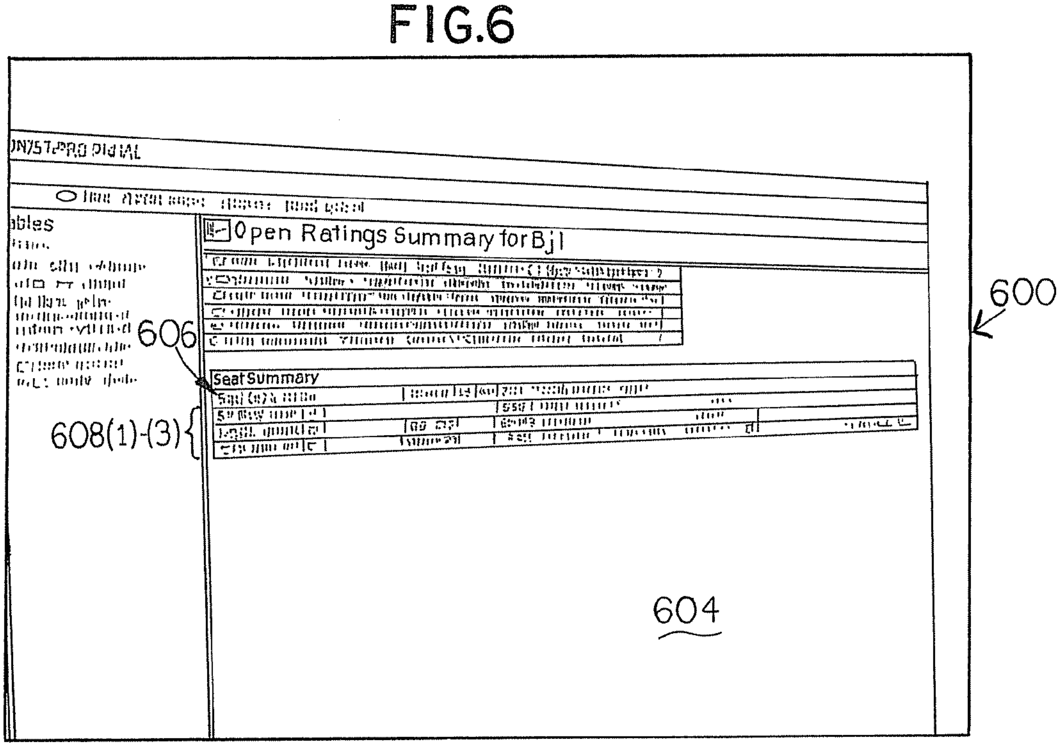
FIG. 6 is a front view of an embodiment of a display showing table summary information (on a non touch screen) including data rows for individual seats, in accordance with a further embodiment.

FIG. 6 depicts an embodiment 600 of a display 604 showing table summary information for a particular gaming table, referenced as black jack table "Bj1" with display heading "Open Ratings Summary for Bj1." In this FIG. 6, the dealer has called-up detailed player account information for the gaming table in a list format. Display 600 can include data rows 606 for individual seats or player positions 608(1)-608 (3), e.g., corresponding to positions 508(1)-508(3) of FIG. 5. As indicated, accumulated table information for a given period of time can be monitored, e.g., by system 200 of FIG. 2, and displayed, such information including, but not limited to: Total in, Total out, Player Win/Loss, Theoretical Win, Average Bet, Game Speed, Player Skill, Hold %, Time Rate (with elapsed/monitored time of rating period), Points Earned, and Comps Earned. It should be understood that the called-up information can take any desirable form such as individual data, all player data or the like. Casino personnel can call-up the desired information using the data input device such as the touch screen.

With continued reference to FIG. 6, display 604 can also include player statistics or betting behaviors/actions relative to individual table seat positions. As shown in rows 608(1)-608(3), a particular player, e.g., fictitious player "Scarlet Clue," can be monitored and the player's betting actions tracked as that player moves (moved) from different seat positions 606 at the related gaming table.

Figure 7:
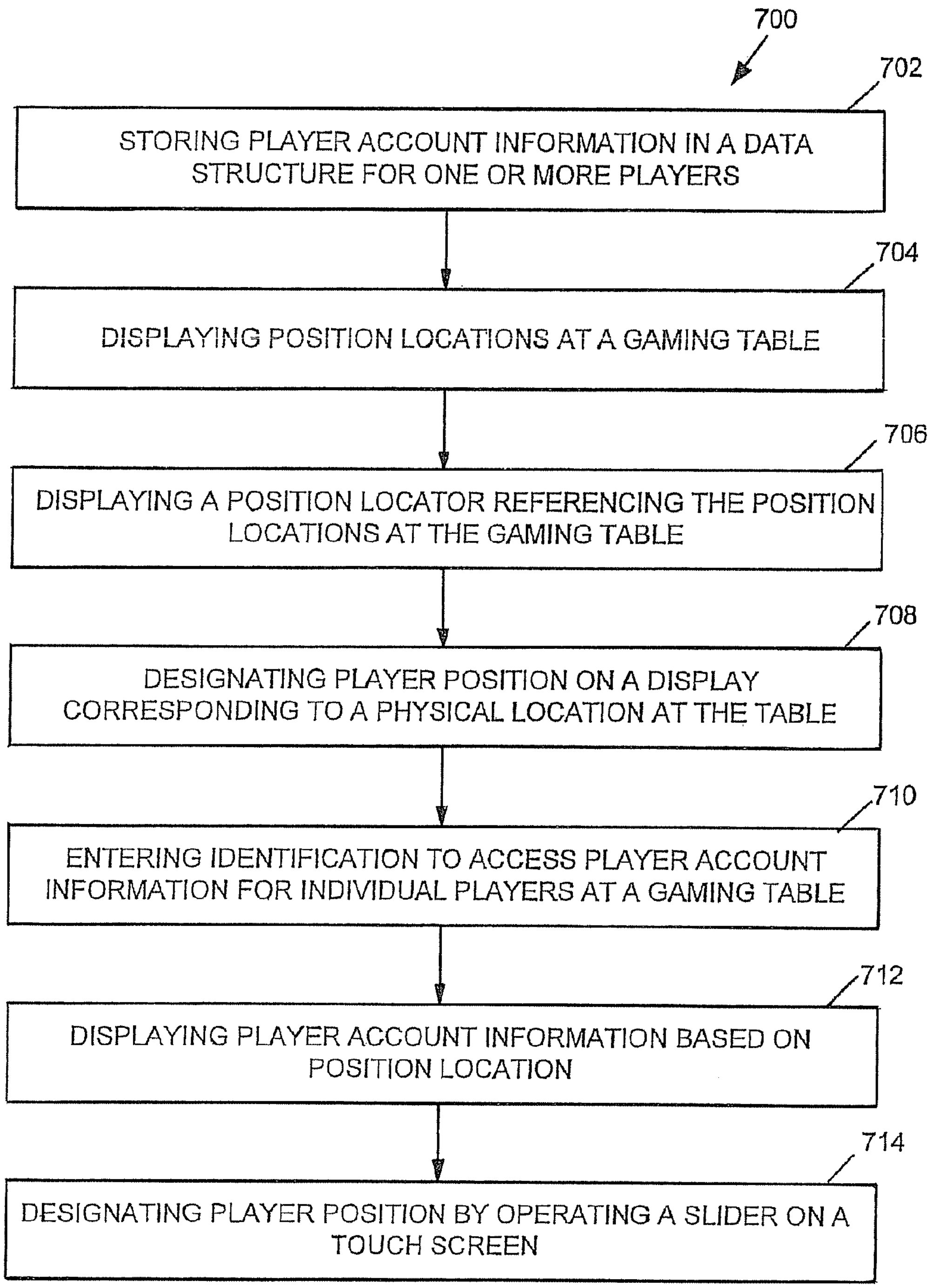
FIG. 7 depicts a method according to an embodiment of the present disclosure.

FIG. 7 depicts a method 700 of entering player information and monitoring player activity at a gaming table according to an embodiment of the present disclosure. Method 700 can include storing player account information 702 in a data structure for one or more players. This player account information may be entered at a gaming table or when a player registers an account with a gaming operation.

As step 704, position locations corresponding to position locations at a gaming table are displayed. In some embodiments, the position locations are displayed on a display device near a gaming table where a dealer may utilize the display. In other embodiments, the position locations may be displayed on device remote from the dealer. This remote display may allow monitoring by casino operations staff, for security or financial monitoring.

At step 706, a position locator configured to point to or indicate a location from among the possible table locations is displayed. This position locator can be used to track the activity of players at the various positions at the gaming table.

At step 708, a player position can be designated on a display. The designated player position corresponds to the player's physical position at the gaming table. For example, when a player sits down at a table, the player's position can be displayed on a display device. In a preferred embodiment, the player's position will correspond to a location in relating to a gaming table. The position locator from step 706 may be used to designate the player position.

At step 710, identification or other information can be entered to access player account information. For example, the dealer may swipe a player's identification card to access the player's account information. In exemplary embodiments, a player can be "sited," as shown at 708 before the card is read at 710.

At step 712, a player's account information or related information such as regulatory exclusion, can be displayed on a display. In a preferred embodiment, the player's account information will be displayed based on the player's position. In alternative embodiments, the player's account information will be displayed in response to a request from a dealer.

At step 714, a player position may be indicated by operation of a slider. In an exemplary embodiment, a dealer operating a touch-screen slider may indicate the player's position. For example, designating a designated player position can include operating a touch-screen slider on a display and/or operating a mouse and a cursor on a display. Controlling the position locator may be accomplished by designating a designated player position with the operation of a data input device. A suitable data input device can be a touch screen slider, a cursor and a mouse operational with one another, etc. As stated previously, a locator and a portion of the data input device can be separate from one another on a display. As also stated previously, control of a position locator can include operation of a processor operatively that is linked to the position locator and a suitable data input device.

While certain embodiments have been described herein, it will be understood by one skilled in the art that the methods, systems, and apparatus of the present disclosure may be embodied in other specific forms without departing from the spirit thereof. For example, while a data input device according to the present disclosure has generally been described as including a touch-screen based slider, systems and methods of the present disclosure may include other input devices, such as, for example, a keyboard, a mouse, and a microphone, etc.

Accordingly, the embodiments described herein are accordingly to be considered in all respects as illustrative of the present disclosure and not restrictive.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for storing player data at a gaming table having a plurality of player positions and a dealer position, the system comprising:

a display for viewing by the dealer at said dealer position;

a data structure configured to store player data, said player data including at least player identification data;

a processor, wherein said processor is configured to provide said display with a depiction of (1) the gaming table, (2) the plurality of player positions, (3) a moveable position locator, and (4) a manually operable dealer input device displayed on said display, said dealer input device utilizable by accepting input from a dealer touching said dealer input device to actuate the moveable position locator to move to a display position so as to visually identify one player position, wherein the moveable position locator comprises a pointer on said display, the pointer being configured to be controllably moved by the manually operable dealer input device to visually point to said one player position when a dealer manipulates the manually operable dealer input device displayed on said display;

an access device configured to access said player data for said processor and wherein said processor is configured to associate said player identification data with a player position visually identified by said pointer; and wherein said processor is configured to control said display to display said manually operable dealer input device being a slider having a plurality of distinct slider positions, each said slider position corresponding to one of said player positions, such that selection of one of said slider positions using said manually operable dealer input device causes the moveable position locator to visually identify the corresponding player position.

2. The system of claim 1, wherein said player data includes betting activity of a player; and wherein said processor is further adapted to track the betting activity of a player.

3. The system of claim 1, wherein said processor is adapted to cause said display to highlight the identified player position.

4. The system of claim 1, wherein said position locator comprises a pointer which is moveable under control of the manually operable input device to point to a said player position.

5. The system of claim 1, wherein said manually operable dealer input device comprises a touch screen input device.

6. A non-transitory computer readable media for storing a plurality of executable instructions, wherein execution of said plurality of instructions relative to a display causes:

displaying on said display player position locations corresponding to one or more player positions at a gaming table, and a dealer position location corresponding to a dealer position at the gaming table;

displaying on said display a moveable position indicator configured to be manually controlled so as to visually indicate a player position location on said display corresponding to said one or more player positions, wherein the moveable position indicator comprises a pointer on said display, the pointer being arranged to be controllably moved to point to said player position location in response to a dealer input device being manually manipulated by a dealer;

displaying on said display a manually operable dealer input device, said dealer input device being a touch-screen slider having a plurality of distinct slider positions, each slider position corresponding to one of said player positions, said touch-screen slider being utilizable by accepting input from a dealer touching said touch-screen slider to controllably select one of said slider positions to thereby move said pointer to visually identify said player position location;

entering identification related to a player for accessing player account information;

designating a designated player position location via said touch-screen slider, wherein the designated player position location corresponds to an indicated player position; and displaying account information for a player based on the designated player position location.

7. The computer readable medium of claim 6, wherein execution of said plurality of instructions further causes storing a record of a player's betting activity.

8. The computer readable medium of claim 6, wherein a plurality of betting positions are made at the gaming table, and wherein execution of said plurality of instructions further causes designating the plurality of betting positions, wherein said plurality of betting positions corresponds to a single designated player position location.

9. The computer readable medium of claim 6, wherein entering identification related to the player further comprises utilizing a biometric scanner.

* * * * *